United States Patent
Dulaney (10) Patent No.: US 8,069,421 B2
(45) Date of Patent: *Nov. 29, 2011

(54) METHODS AND APPARATUS FOR GRAPHICAL OBJECT IMPLEMENTATION

(75) Inventor: Marissa H. Dulaney, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/505,563

(22) Filed: Jul. 20, 2009

(65) Prior Publication Data

US 2009/0288009 A1 Nov. 19, 2009

Related U.S. Application Data

(63) Continuation of application No. 11/315,027, filed on Dec. 22, 2005, now Pat. No. 7,614,012.

(51) Int. Cl.
*G06F 3/048* (2006.01)
*G06F 3/00* (2006.01)

(52) U.S. Cl. ........ 715/838; 715/716; 715/723; 715/726; 715/835

(58) Field of Classification Search .................. 715/716, 715/723, 726, 764, 835, 838
See application file for complete search history.

(56) References Cited

U.S. PATENT DOCUMENTS

| | | | |
|---|---|---|---|
| 5,359,712 A * | 10/1994 | Cohen et al. | 715/723 |
| 5,404,316 A * | 4/1995 | Klingler et al. | 715/723 |
| 5,442,744 A * | 8/1995 | Piech et al. | 715/251 |
| 5,675,752 A * | 10/1997 | Scott et al. | 715/866 |
| 5,999,173 A | 12/1999 | Ubillos | |
| 6,204,840 B1 * | 3/2001 | Petelycky et al. | 715/202 |
| 6,928,613 B1 * | 8/2005 | Ishii et al. | 715/726 |
| 7,030,872 B2 * | 4/2006 | Tazaki | 345/418 |
| 7,073,127 B2 * | 7/2006 | Zhao et al. | 715/719 |
| 7,552,388 B2 * | 6/2009 | Yoshimine | 715/723 |
| 7,644,364 B2 * | 1/2010 | Patten et al. | 715/726 |
| 2001/0040592 A1 | 11/2001 | Foreman et al. | |
| 2002/0126143 A1 * | 9/2002 | Bae et al. | 345/723 |
| 2003/0016947 A1 | 1/2003 | Ishii | |
| 2004/0095396 A1 | 5/2004 | Stavely et al. | |
| 2004/0100487 A1 | 5/2004 | Mori et al. | |
| 2005/0283741 A1 * | 12/2005 | Balabanovic et al. | 715/838 |
| 2006/0282759 A1 * | 12/2006 | Collins et al. | 715/500 |
| 2007/0136750 A1 | 6/2007 | Abanami et al. | |

OTHER PUBLICATIONS

Office Action dated Oct. 29, 2007 in U.S. Appl. No. 11/315,027.
Office Action dated Mar. 21, 2008 in U.S. Appl. No. 11/315,027.
Office Action dated Jun. 9, 2008 in U.S. Appl. No. 11/315,027.
Office Action dated Oct. 9, 2008 in U.S. Appl. No. 11/315,027.
Office Action dated Feb. 25, 2009 in U.S. Appl. No. 11/315,027.
Advisory Action dated Apr. 27, 2009 in U.S. Appl. No. 11/315,027.
Notice of Allowance dated Jun. 11, 2009 in U.S. Appl. No. 11/315,027.

* cited by examiner

*Primary Examiner* — Steven P Sax
*Assistant Examiner* — Grant D Johnson
(74) *Attorney, Agent, or Firm* — Kilpatrick Townsend & Stockton LLP (57) ABSTRACT

A system displays a graphical element in a graphical user interface, and receives a command to display the at least one graphical sub-element associated with the graphical element. The system replaces the display of the graphical element with a display of at least one graphical sub-element associated with the graphical element, and implements the graphical sub-element such that execution of the graphical element invokes execution of the graphical sub-element associated with the graphical element.

21 Claims, 9 Drawing Sheets

206 DISPLAY THE GRAPHICAL ELEMENT

207 DISPLAY THE GRAPHICAL ELEMENT WITH A SUB-ELEMENT IDENTIFIER, IDENTIFYING AT LEAST ONE GRAPHICAL SUB-ELEMENT ASSOCIATED WITH THE GRAPHICAL ELEMENT

208 DISPLAY THE SUB-ELEMENT IDENTIFIER WITH AN INDICATION OF A TYPE OF GRAPHICAL SUB-ELEMENT ASSOCIATED WITH THE GRAPHICAL ELEMENT

209 DISPLAY THE SUB-ELEMENT IDENTIFIER WITH AN INDICATION OF A VIDEO TO EXECUTE UPON EXECUTION OF THE GRAPHICAL ELEMENT

OR

210 DISPLAY THE SUB-ELEMENT IDENTIFIER WITH AN INDICATION OF A TIMELINE ASSOCIATED WITH THE GRAPHICAL ELEMENT, THE TIMELINE INCLUDING:
I) AN ORDER IN WHICH THE AT LEAST ONE GRAPHICAL SUB-ELEMENT IS TO BE INVOKED UPON EXECUTION OF THE GRAPHICAL ELEMENT,
II) A TIME DURATION DURING WHICH THE AT LEAST ONE GRAPHICAL SUB-ELEMENT WILL EXECUTE

211 RECEIVE NOTIFICATION THAT A USER HAS SELECTED THE SUB-ELEMENT IDENTIFIER

*FIG. 6*

212 DISPLAY THE SUB-ELEMENT IDENTIFIER WITH AN INDICATION OF A TYPE OF GRAPHICAL SUB-ELEMENT ASSOCIATED WITH THE GRAPHICAL ELEMENT.

213 DISPLAY THE SUB-ELEMENT IDENTIFIER WITH AN INDICATION OF A VISUAL EFFECT TO EXECUTE UPON EXECUTION OF THE GRAPHICAL ELEMENT

214 DISPLAY THE SUB-ELEMENT IDENTIFIER WITH AN INDICATION OF A VISUAL EFFECT OF A PAN AND ZOOM EFFECT ON THE GRAPHICAL ELEMENT WHEREBY A FIRST PORTION OF THE AT LEAST ONE GRAPHICAL SUB-ELEMENT IS EXPANDED FOLLOWED BY A MOVEMENT TO A SECOND PORTION OF THE AT LEAST ONE GRAPHICAL SUB-ELEMENT WHERE THE SECOND PORTION OF A GRAPHICAL SUB-ELEMENT IS EXPANDED

METHODS AND APPARATUS FOR GRAPHICAL OBJECT IMPLEMENTATION

CROSS REFERENCE TO RELATED APPLICATIONS

This patent application is a Continuation of U.S. patent application Ser. No. 11/315,027 filed on Dec. 22, 2005 now U.S. Pat. No. 7,614,012, entitled, "METHODS AND APPARATUS FOR GRAPHICAL OBJECT IMPLEMENTATION", the contents and teachings of which are hereby incorporated by reference in their entirety.

BACKGROUND

Conventional computerized devices, such as personal computers, laptop computers, and the like utilize graphical user interface in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents (i.e., web pages, brochures, etc) and/or projects, such as a storyboard, by dragging and dropping graphical objects (i.e., text, text boxes, images, etc) into the document and/or project. A storyboard is a digital visual overview of a sequence of events, where each event is an element in the storyboard, usually represented by a thumbnail image or icon. There may be different visual items in the storyboard to represent different types of elements. Each type of element is identically sized regardless of the length of time of the entry (unlike a timeline where the physical size denotes length of time). This is usually used when creating a video or a slideshow, but can be used to for other purposes as well, such as planning a process. Sub-elements (such as timelines, videos, additional information about the element, etc) can be attached to an element in the storyboard, and invoked during execution of the storyboard. For example, a sub-element, such as a video, can be attached to an element, such as a thumbnail image. During execution of the storyboard, when the sequence of events reaches the element (i.e., the thumbnail image), the video (i.e., the sub-element attached to the element) is played. It is this association of sub-elements to elements in the storyboard that work together to create a more interesting tale for the storyboard.

SUMMARY

Conventional technologies for editing storyboards suffer from a variety of deficiencies. In particular, conventional technologies for editing storyboards are limited in that only high-level views of elements (i.e., the high level thumbnail images) in the storyboard are shown within the graphical user interface used to develop the storyboard. The underlying sub-elements (i.e., videos, timelines, visual effects, etc) are not shown along with the high level elements, making it difficult for a storyboard developer to keep track of all sub-elements associated with their respective elements. Additionally, efforts to access the sub-elements (i.e., for modification, etc) associated with elements (i.e., the high level thumbnail images) in the storyboard require additional efforts of the storyboard developer to locate those sub-elements.

Embodiments disclosed herein significantly overcome such deficiencies and provide a system that includes a computer system executing a graphical element displaying process within a graphical user interface. The graphical element displaying process allows a user to expand an element (i.e., a thumbnail image) within a storyboard to view the sub-elements associated with that element. This allows the user to view the sub-elements alongside the other elements in the context of the storyboard. The user can modify the sub-elements, and view how this modification will affect the transition in the storyboard from the sub-elements (being modified) to the next element in the sequence of elements within the storyboard. When finished modifying the sub-elements, the user can collapse the sub-elements to view only the element (i.e., the thumbnail image) associated with those sub-elements. This ability to expand and collapse elements within the storyboard allows a user to more efficiently navigate the storyboard.

The graphical element displaying process displays the graphical element, and receives a command to display at least one graphical sub-element associated with the graphical element. The graphical element displaying process replaces the display of the graphical element with a display of at least one graphical sub-element associated with the graphical element. The graphical element display process then implements the graphical sub-element such that execution of the graphical element invokes execution of the graphical sub-element associated with the graphical element. In one embodiment, the graphical element displaying process receives a command to display the graphical element; and replaces the display of the graphical sub-element associated with the graphical element with the display of the graphical element. Thus, a user can expand the graphical element to view the associated graphical sub-elements and also collapse the graphical sub-elements to view the associated element.

During an example operation of one embodiment, suppose a user, such as a graphical designer, is creating a project containing a storyboard. The storyboard contains a series of thumbnail images. Some of the thumbnail images have videos attached to them; others have visual effects (i.e., "pan and zoom", etc). The graphical designer can select one of the thumbnail images, expanding that thumbnail image to display the sub-elements (i.e., a video, visual effect, etc) associated with that thumbnail image. Within the storyboard, the graphical designer can view the sub-elements associated with the selected thumbnail, while still viewing the other thumbnail images in the storyboard (i.e., the non-selected thumbnail images). The graphical designer can now modify the sub-elements in the context of the whole storyboard (i.e., the non-selected thumbnail images), allowing the graphical designer to view how the sub-elements will impact the storyboard as a whole.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods and a computer system that perform a graphical element displaying process within a graphical user interface. The graphical element displaying process allows a user to expand an element (i.e., a thumbnail image) within a storyboard to view the sub-elements associated with that element. This allows the user to view the sub-elements alongside the other elements in the context of the storyboard. The user can modify the sub-elements, and view how this modification will affect the transition in the storyboard from the sub-elements (being modified) to the next element in the sequence of elements within the storyboard. When finished modifying the sub-elements, the user can collapse the sub-elements to view only the element (i.e., the thumbnail image) associated with those sub-elements. This ability to expand and collapse elements within the storyboard allows a user to more efficiently navigate the storyboard.

The graphical element displaying process displays the graphical element, and receives a command to display at least one graphical sub-element associated with the graphical element. The graphical element displaying process replaces the display of the graphical element with a display of at least one graphical sub-element associated with the graphical element, and implements the graphical sub-element such that execution of the graphical element invokes execution of the graphical sub-element associated with the graphical element. In one embodiment, the graphical element displaying process receives a command to display the graphical element; and replaces the display of the graphical sub-element associated with the graphical element with the display of the graphical element. Thus, a user can expand the graphical element to view the associated graphical sub-elements and also collapse the graphical sub-elements to view the associated element.

Figure 1:
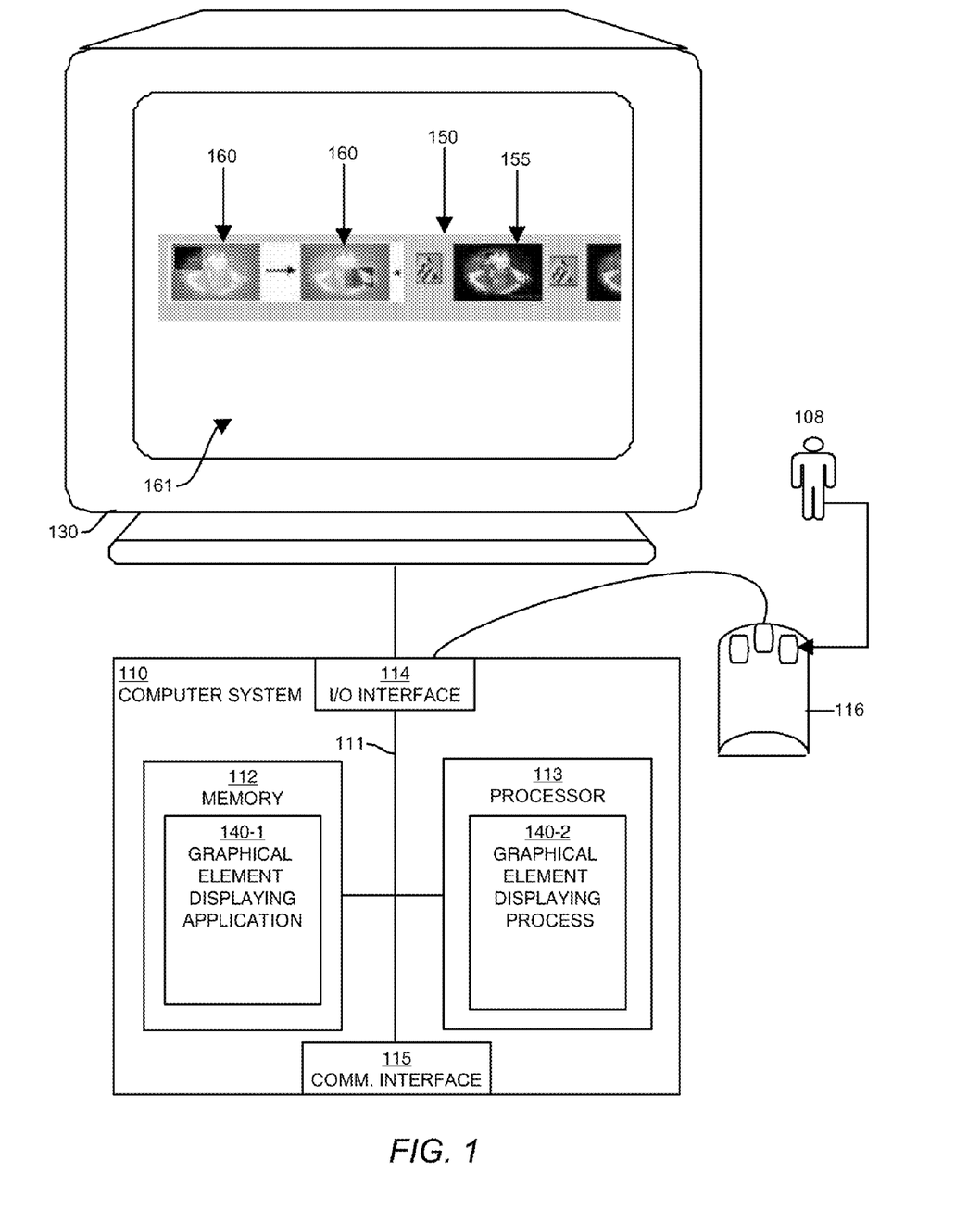
FIG. 1 shows a high-level block diagram of a computer system according to one embodiment disclosed herein.

FIG. 1 is a block diagram illustrating example architecture of a computer system 110 that executes, runs, interprets, operates or otherwise performs a graphical element displaying application 140-1 and graphical element displaying process 140-2 suitable for use in explaining example configurations, according to one embodiment disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 161 that the graphical element displaying application 140-1 and process 140-2 provides on the display 130. The graphical user interface 161 displays a storyboard 150 containing a graphical element 155 and graphical sub-elements 160. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a graphical element displaying application 140-1 as explained herein. The graphical element displaying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the graphical element displaying application 140-1. Execution of the graphical element displaying application 140-1 in this manner produces processing functionality in a graphical element displaying process 140-2. In other words, the graphical element displaying process 140-2 represents one or more portions or runtime instances of the graphical element displaying application 140-1 (or the entire graphical element displaying application 140-1) performing or executing within or upon the processor 113 in the computerized device 110 at runtime.

It is noted that example configurations disclosed herein include the graphical element displaying application 140-1 itself (i.e., in the form of un-executed or non-performing logic instructions and/or data). The graphical element displaying application 140-1 may be stored on a computer readable medium (such as a floppy disk), hard disk, electronic, magnetic, optical, or other computer readable medium. The graphical element displaying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the graphical element displaying application 140-1 in the processor 113 as the graphical element displaying process 140-2 including the managing application process 150. Those skilled in the art will understand that the computer system 110 may include other processes and/or software and hardware components, such as an operating system not shown in this example.

A display 130 need not be coupled directly to computer system 110. For example, the graphical element displaying application 140-1 can be executed on a remotely accessible computerized device via the network interface 115. In this instance, the graphical user interface 161 may be displayed locally to a user 108 of the remote computer and execution of the processing herein may be client-server based.

Figure 2:
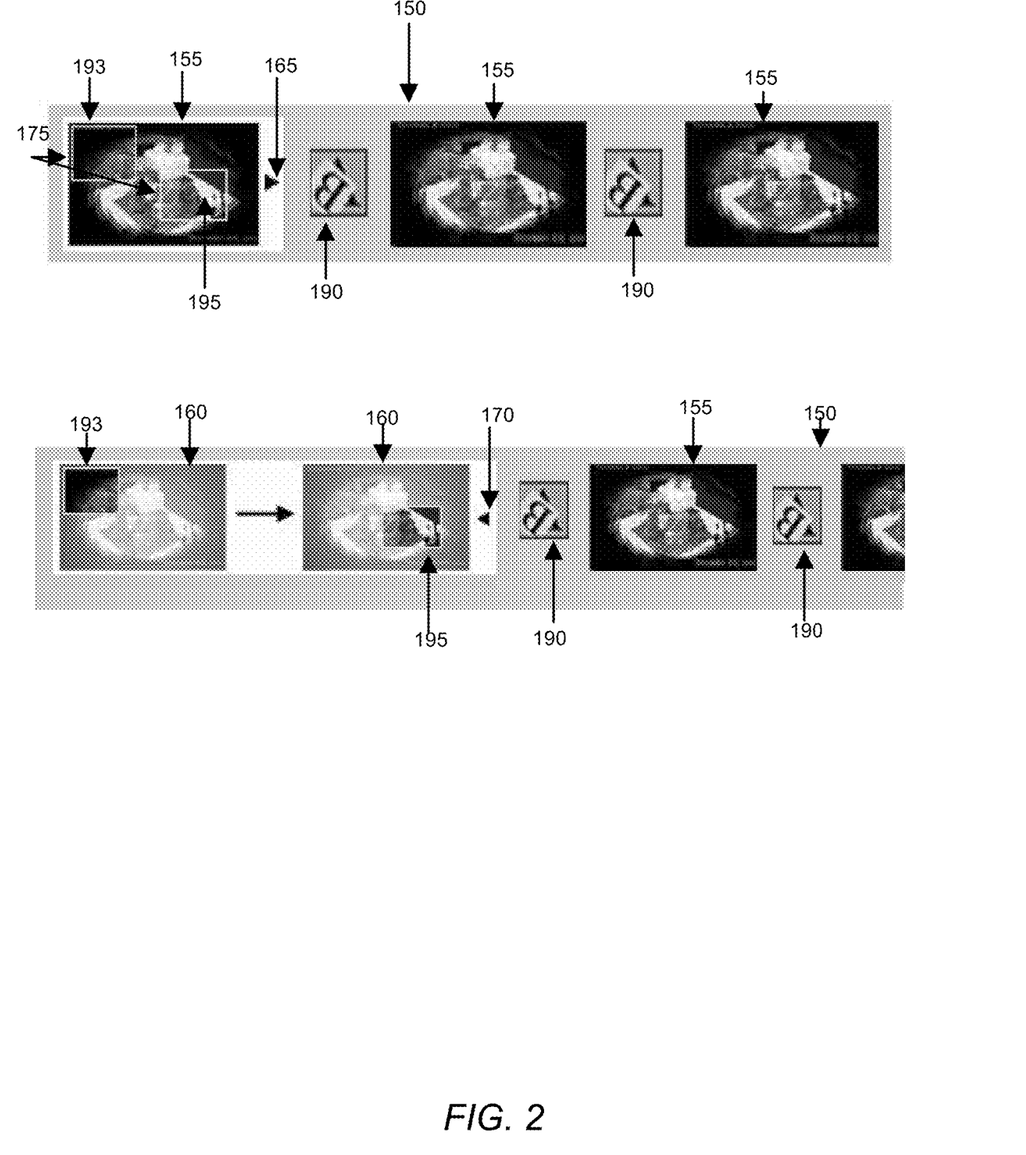
FIG. 2 shows an example screenshot of a storyboard containing elements and sub-elements where the sub-elements display a visual effect, according to one embodiment disclosed herein.

FIG. 2 displays an example screen shot of a storyboard 150 containing graphical elements 155, one of which has been expanded to display the graphical sub-elements 160 associated with the expanded graphical element 155, according to one embodiment disclosed herein. The expanded graphical element 155 includes a sub-element identifier 165, that, when selected, displays the graphical sub-elements 160. FIG. 2 displays an example of a type 175 of graphical sub-element 160 associated with the graphical element 155. In this example, a visual effect called "pan and zoom" is indicated, where a first area 193 is displayed, and then a second area 195 is displayed. The storyboard also displays transition effects 190 that occur between the displaying of each of the graphical elements 155 in the sequence of graphical elements 155 that make up the storyboard 150. The graphical sub-elements 160 contain an element identifier 170, that, when selected, collapses the graphical sub-elements 160 to display the graphical element 155 associated with those graphical sub-elements 160.

Figure 3:
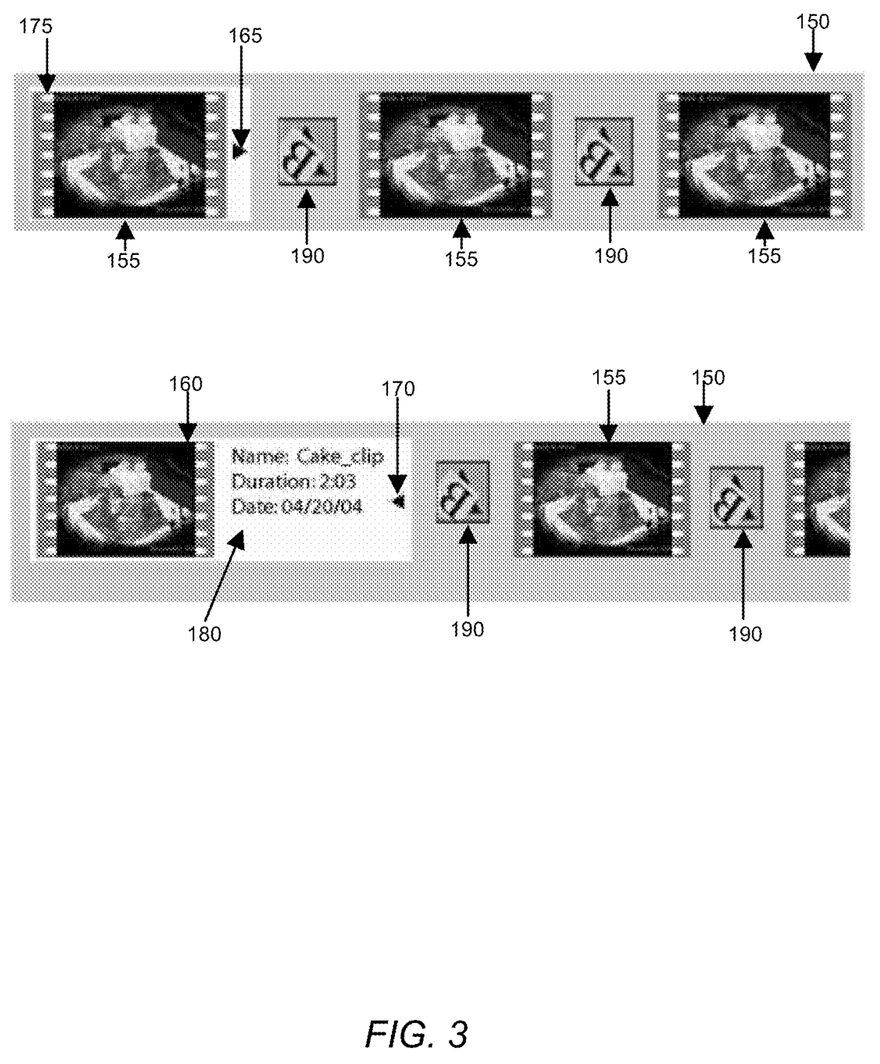
FIG. 3 shows an example screenshot of a storyboard containing elements and sub-elements where the sub-elements display a video attached to the element, according to one embodiment disclosed herein.

FIG. 3 displays an example screen shot of a storyboard 150 containing graphical elements 155, one of which has been expanded to display the graphical sub-elements 160 associated with the expanded graphical element 155, according to one embodiment disclosed herein. The expanded graphical element 155 includes a sub-element identifier 165, that, when selected, displays the graphical sub-elements 160. FIG. 3 displays an example of a type 175 of graphical sub-element 160 associated with the graphical element 155. In this example, a video 180 is the graphical sub-element 160 associated with the graphical element 155, and this is indicated by the film tracking icon (i.e., the type 175 of graphical sub-element 160) surrounding the graphical element 155. The storyboard also displays transition effects 190 that occur between the displaying of each of the graphical elements 155 in the sequence of graphical elements 155 that make up the storyboard 155. The graphical sub-elements 160 contain an element identifier 170, that, when selected, collapses the graphical sub-elements 160 to display the graphical element 155 associated with those graphical sub-elements 160.

Figure 4:
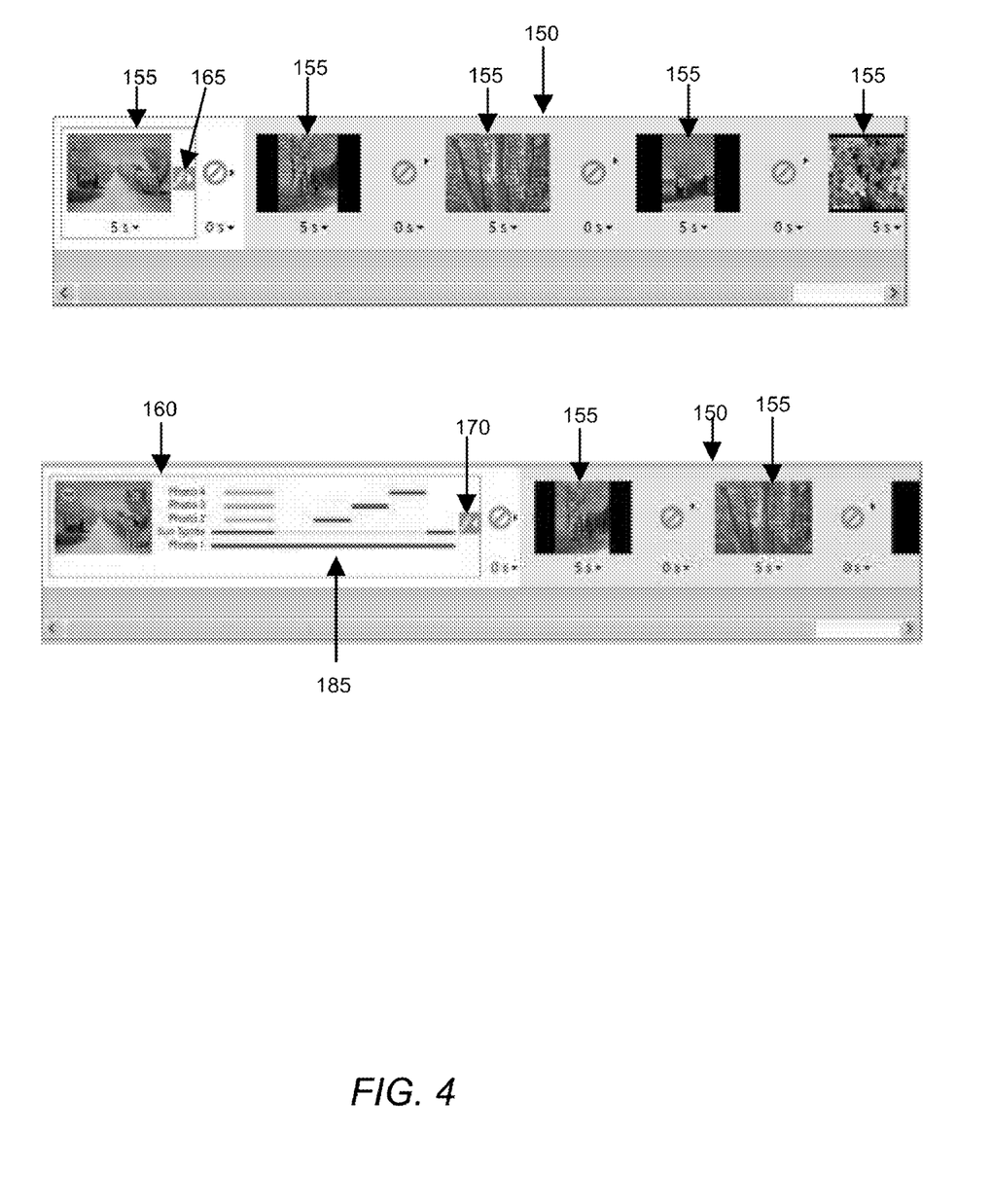
FIG. 4 shows an example screenshot of a storyboard containing elements and sub-elements where the sub-elements display a timeline, according to one embodiment disclosed herein.

FIG. 4 displays an example screen shot of a storyboard 150 containing graphical elements 155, one of which has been expanded to display the graphical sub-elements 160 associated with the expanded graphical element 155, according to one embodiment disclosed herein. The expanded graphical element 155 includes a sub-element identifier 165, that, when selected, displays the graphical sub-elements 160. FIG. 4 displays a timeline 185 indicating a series of graphical sub-elements 160 and a time duration of each of the graphical sub-elements 160 listed in the timeline 185. The graphical sub-elements 160 contain an element identifier 170, that, when selected, collapses the graphical sub-elements 160 to display the graphical element 155 associated with those graphical sub-elements 160.

Further details of configurations explained herein will now be provided with respect to a flow chart of processing steps that show the high level operations disclosed herein to perform the graphical element displaying process 140-2.

Figure 5:
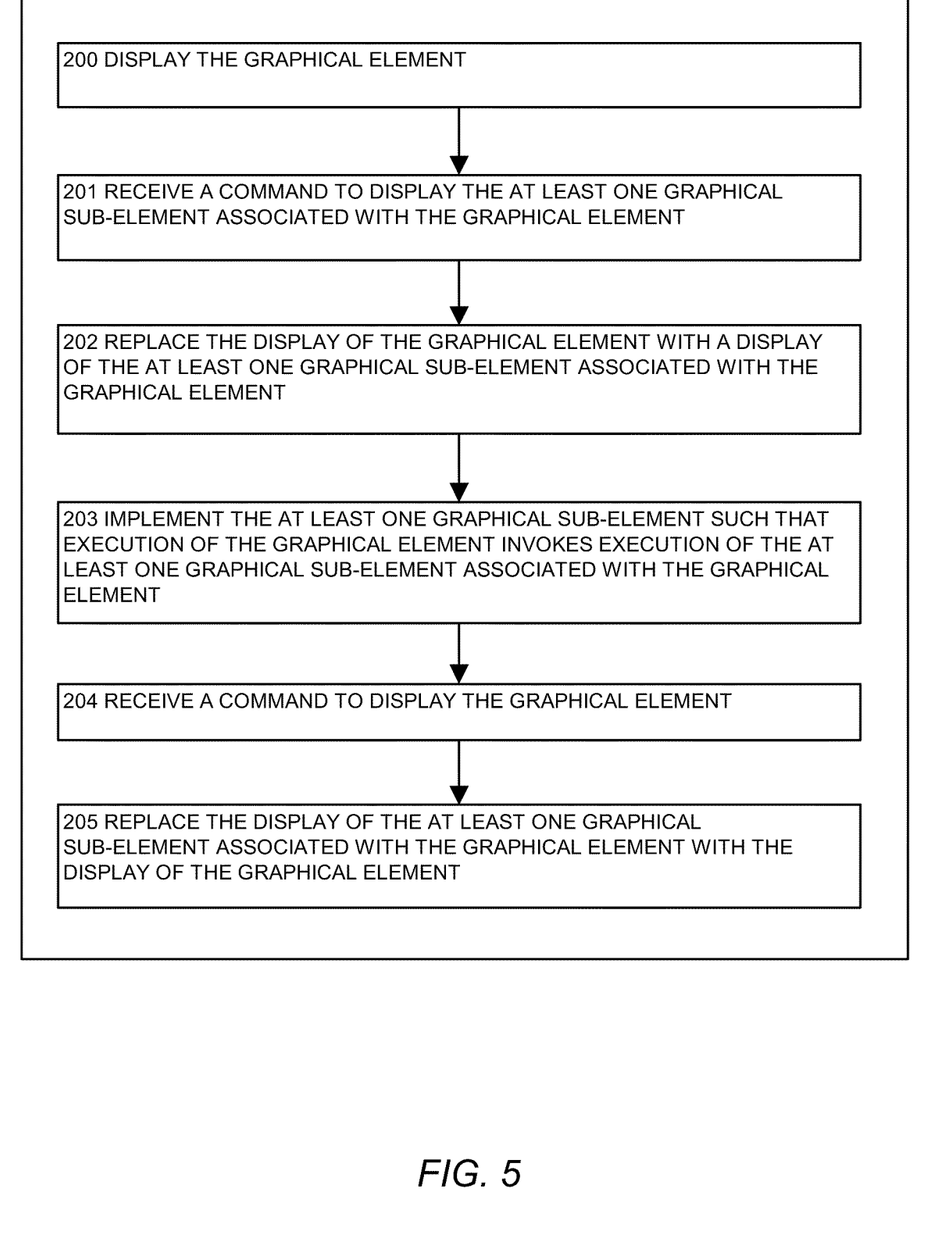
FIG. 5 illustrates a flowchart of a procedure performed by the system of FIG. 1 when the graphical element displaying process displays the graphical element, according to one embodiment disclosed herein.

FIG. 5 is a flowchart of the steps performed by the graphical element displaying process 140-2 when it displays the graphical element 155 and receives a command to display the graphical sub-element 160 associated with the graphical element 155, according to one embodiment disclosed herein. The graphical element displaying process 140-2 allows a user 108 to expand graphical element 155 within a storyboard 150 to view the graphical sub-elements 160 associated with that element. This allows the user 108 to view the graphical sub-elements 160 alongside the other graphical elements 155 in the context of the storyboard 150.

In step 200, the graphical element displaying process 140-2 displays the graphical element 155. FIG. 2 displays a storyboard 150 with three graphical elements 155 and two transition effects 190. The transition effects 190 are used to transition the storyboard 150 from one graphical element 155 to the next graphical element 155 within the sequence of graphical elements 155.

In step 201, the graphical element displaying process 140-2 receives a command to display at least one graphical sub-element 160 associated with the graphical element 155. In an example configuration, a user 108 selects the graphical element 155 to display the graphical sub-elements 160.

In step 202, the graphical element displaying process 140-2 replaces the display of the graphical element 155 with a display of at least one graphical sub-element 160 associated with the graphical element 155. In an example configuration, a graphical element 155 can have more than one graphical sub-element 160 associated with the graphical element 155. FIG. 2 displays a storyboard 150 where one of the graphical elements 155 has been expanded to display two graphical sub-elements 160 associated with the graphical element 155. The storyboard 150 still contains the two transition effects 190 used to transition the storyboard from one graphical element 155 to the next graphical element 155 within the sequence of graphical elements 155.

In step 203, the graphical element displaying process 140-2 implements at least one graphical sub-element 160 such that execution of the graphical element 155 invokes execution of at least one graphical sub-element 160 associated with the graphical element 155. During the execution of the storyboard 150, each graphical element 155 in the sequence of graphical elements 155 is executed (i.e., displayed within the storyboard). When a graphical element 155 to which graphical sub-elements 160 are associated, is executed, those graphical sub-elements 160 are executed (i.e., displayed within the storyboard). For example, a graphical element 155 could have a video graphical sub-element 160 associated with the graphical element 155. When the graphical element 155 is executed, the video 180 associated with the graphical element 155 is played. In other words, regardless of whether the graphical sub-elements 160 are displayed within the storyboard 150, those graphical sub-elements 160 are still executed when the graphical element 155 is executed. However, when the graphical sub-elements 160 are displayed during execution, a user 108 can track the execution of each graphical sub-element 160 within the storyboard 150 as those graphical sub-elements 160 are executed. In an example configuration, the graphical sub-elements 160 may be multiple photos or videos in a sequence. The user 108 may expand one graphical element 155 to view a sequence of, for example, ten thumbnails, each thumbnail representing a video or photo that will play when the graphical element 155 is executed.

In step 204, the graphical element displaying process 140-2 receives a command to display the graphical element 155. In an example configuration, the storyboard 150 is displaying the graphical sub-elements 160 associated with a given graphical element 155. To view that graphical element 155, a user 108 can select a command to view the graphical element 155 to which the graphical sub-elements 160 are associated.

In step 205, the graphical element displaying process 140-2 replaces the display of at least one graphical sub-element 160 associated with the graphical element 155 with the display of the graphical element 155. The storyboard 150 now displays the graphical element 155 to which the graphical sub-elements 160 are associated.

Figure 6:
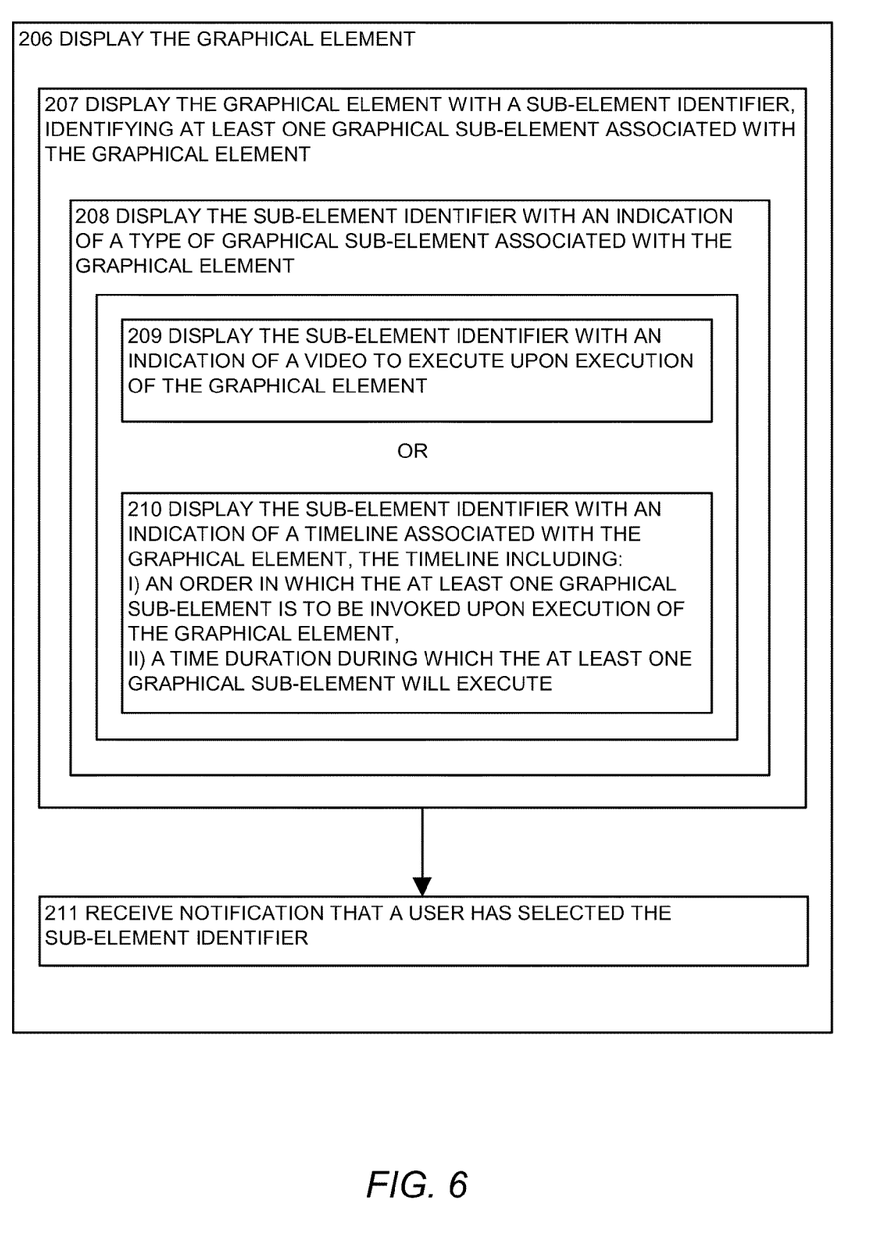
FIG. 6 illustrates a flowchart of a procedure performed by the system of FIG. 1 when the graphical element displaying process displays the graphical element, according to one embodiment disclosed herein.

FIG. 6 is a flowchart of the steps performed by the graphical element displaying process 140-2 when it displays the graphical element 155 having at least one graphical sub-element 160 associated with the graphical element 155, according to one embodiment disclosed herein. The graphical element 155 is displayed with an indication that a graphical sub-element 160 is associated with the graphical element 155.

In step 206, the graphical element displaying process 140-2 displays the graphical element 155. FIG. 2 displays a storyboard 150 with three graphical elements 155 and two transition effects 190. The transition effects 190 are used to transition the storyboard 150 from one graphical element 155 to the next graphical element 155 within the sequence of graphical elements 155.

In step 207, the graphical element displaying process 140-2 displays the graphical element 155 with a sub-element identifier 165, identifying at least one graphical sub-element 160 associated with the graphical element 155. The sub-element identifier 165 associated with the graphical element 155 indicates that at least one graphical sub-element 160 is associated with the graphical element 155

In step 208, the graphical element displaying process 140-2 displays the sub-element identifier 165 with an indication of a type 175 of graphical sub-element 160 associated with the graphical element 155. The type 175 of graphical sub-element 160 associated with the graphical element 155 could be a video, visual effect, song, etc.

In step 209, the graphical element displaying process 140-2 displays the sub-element identifier 165 with an indication of a video 180 to execute upon execution of the graphical element 155. In an example configuration, the type of graphical sub-element 160 associated with the graphical element 155 is a video 180 that runs when the graphical element 155 (to which the video 180 is associated) is executed within the storyboard 150. FIG. 3 displays an example configuration of a storyboard 150 where a video 180 is a graphical sub-element 160 associated with a graphical element 155. The graphical element 155 has an indication of a type 175 of graphical sub-element 160 associated with the graphical element 155. In this example the indication of a type 175 of graphical sub-element 160 is a film-tracking icon on either side of the graphical element 155.

Alternatively, in step 210, the graphical element displaying process 140-2 displays the graphical sub-element 160 with an indication of a timeline 185 associated with the graphical element 155. The timeline 185 includes an order in which at least one graphical sub-element 160 is to be invoked upon execution of the graphical element 155, and a time duration during which at least one graphical sub-element 160 will execute. FIG. 4 displays an example configuration of a storyboard 150 where a timeline 185 is a graphical sub-element 160 associated with a graphical element 155. In this example, the timeline 185 lists a plurality of graphical sub-elements 160 associated with the graphical element 155, and order in which those graphical sub-elements 160 are to execute, and time duration during which each graphical sub-element 160 will execute.

In step 211, the graphical element displaying process 140-2 receives notification that a user 108 has selected the graphical sub-element 160. In an example configuration, a graphical element 155 within the storyboard 150 has a sub-element identifier 165 associated with the graphical element 155. The graphical element displaying process 140-2 receives notification that a user 108 has selected the sub-element identifier 165, and the graphical element displaying process 140-2 replaces the display of the graphical element 155 with a display of at least one graphical sub-element 160 associated with the graphical element 155.

Figure 7:
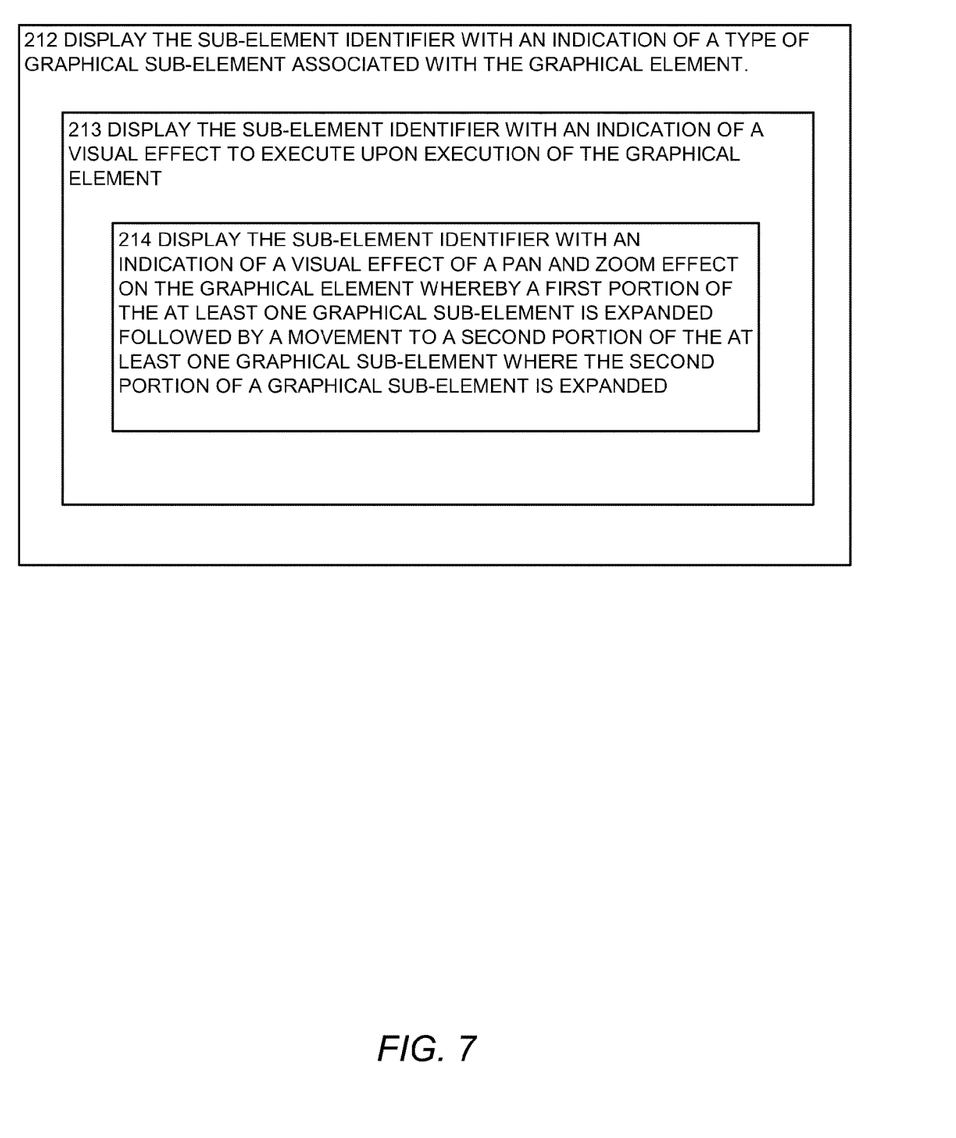
FIG. 7 illustrates a flowchart of a procedure performed by the system of FIG. 1 when the graphical element displaying process displays the sub-element identifier with an indication of a type of graphical sub-element associated, according to one embodiment disclosed herein.

FIG. 7 is a flowchart of the steps performed by the graphical element displaying process 140-2 when it displays the sub-element identifier with an indication of a type 165 of graphical sub-element 160 associated with the graphical element 155, and that type of graphical sub-element 160 is a visual effect, according to one embodiment disclosed herein.

In step 212, the graphical element displaying process 140-2 displays the sub-element identifier 165 with an indication of a type 175 of graphical sub-element 160 associated with the graphical element 155. The type 175 of graphical sub-element 160 associated with the graphical element 155 could be a video, visual effect, song, etc.

In step 213, the graphical element displaying process 140-2 displays the sub-element identifier 165 with an indication of a visual effect to execute upon execution of the graphical element. For example, a visual effect could be the graphical element 155 expanded to show multiple graphical sub-elements 160 indicating the multiple stages of the graphical element 155.

In step 214, the graphical element displaying process 140-2 displays the sub-element identifier 165 with an indication of a visual effect of a "pan and zoom" effect on the graphical element 155. During a "pan and zoom" visual effect, a first area 193 of the graphical sub-element 160 expanded to fill the area previously occupied by the associated graphical element 155, followed by a movement to a second area 195 of the graphical sub-element 160 where the second area 195 fills the area previously occupied by the associated graphical element 155.

Figure 8:
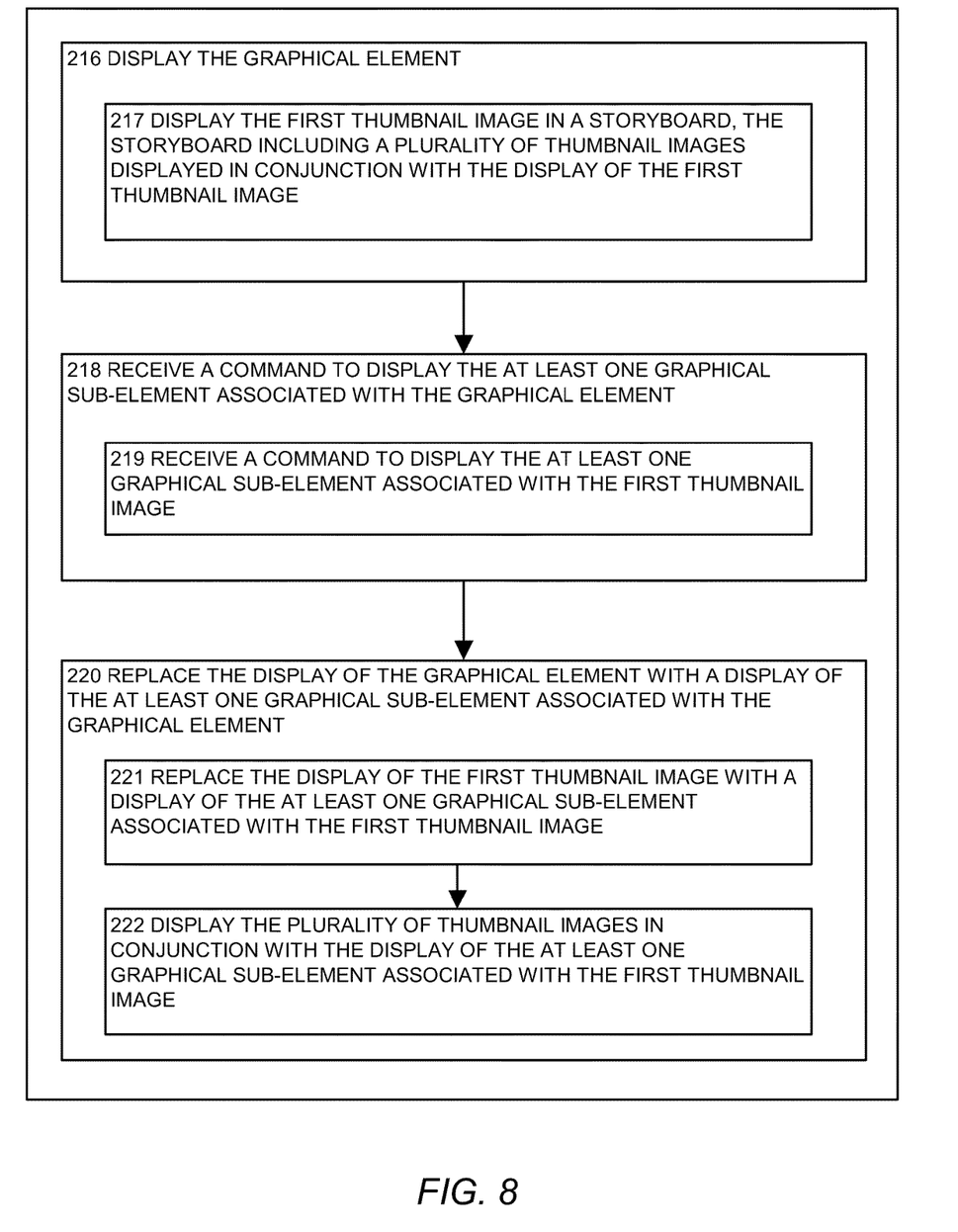
FIG. 8 illustrates a flowchart of a procedure performed by the system of FIG. 1 when the graphical element displaying process displays the graphical element, according to one embodiment disclosed herein.

FIG. 8 is a flowchart of the steps performed by the graphical element displaying process 140-2 when it displays the graphical element 155, and receives a command to display the graphical sub-element 160 associated with the graphical element 155, according to one embodiment disclosed herein. The graphical element displaying process 140-2 allows a user 108 to expand graphical element 155 within a storyboard 150 to view the graphical sub-elements 160 associated with that element. This allows the user 108 to view the graphical sub-elements 160 alongside the other graphical elements 155 in the context of the storyboard 150.

In step 216, the graphical element displaying process 140-2 displays the graphical element 155. FIG. 2 displays a storyboard 150 with three graphical elements 155 and two transition effects 190. The transition effects 190 are used to transition the storyboard 150 from one graphical element 155 to the next graphical element 155 within the sequence of graphical elements 155.

In step 217, the graphical element displaying process 140-2 displays graphical element 155 as a first thumbnail image in a storyboard 150. The storyboard includes a plurality of thumbnail images (i.e., a plurality of graphical elements 155) displayed in conjunction with the display of the first thumbnail image. In other words, the storyboard 150 contains a sequence of graphical elements 155, the sequence including the first thumbnail image and the plurality of thumbnail images.

In step 218, the graphical element displaying process 140-2 receives a command to display at least one graphical sub-element 160 associated with the graphical element 155. In an example configuration, the graphical element displaying process 140-2 receives a command to display the graphical sub-elements 160 associated with the first thumbnail image.

In step 219, the graphical element displaying process 140-2 receives a command to display at least one graphical sub-element 160 associated with the first thumbnail image. In other words, a user 108 has selected a sub-element identifier 165 associated with the first thumbnail image, indicating the user wishes to view the graphical sub-elements 160 associated with the first thumbnail image.

In step 220, the graphical element displaying process 140-2 replaces the display of the graphical element 155 with a display of at least one graphical sub-element 160 associated with the graphical element 155. In an example configuration, the graphical element displaying process 140-2 replaces the display of the first thumbnail image with the graphical sub-element 160 associated with the first thumbnail image.

In step 221, the graphical element displaying process 140-2 replaces the display of the first thumbnail image with a display of at least one graphical sub-element 160 associated with the first thumbnail image. In an example configuration, the first thumbnail image is replaced with a timeline 185 detailing a plurality of thumbnail images to execute upon invocation of the timeline 185.

In step 222, the graphical element displaying process 140-2 displays the plurality of thumbnail images in conjunction with the display of at least one graphical sub-element 160 associated with the first thumbnail image. In other words, when a user 108 selects the sub-element identifier 165 associated with the first thumbnail image, the graphical sub-elements 160 associated with the first thumbnail image are displayed, alongside the plurality of thumbnail images that make up the storyboard 150. The graphical sub-elements 160 associated with the first thumbnail image replace the first thumbnail image within the storyboard 150. Likewise, when a user selects the element identifier 170 associated with the graphical sub-elements 160 (associated with the first thumbnail image), those graphical sub-elements 160 are replaced with the first thumbnail image within the storyboard 150.

Figure 9:
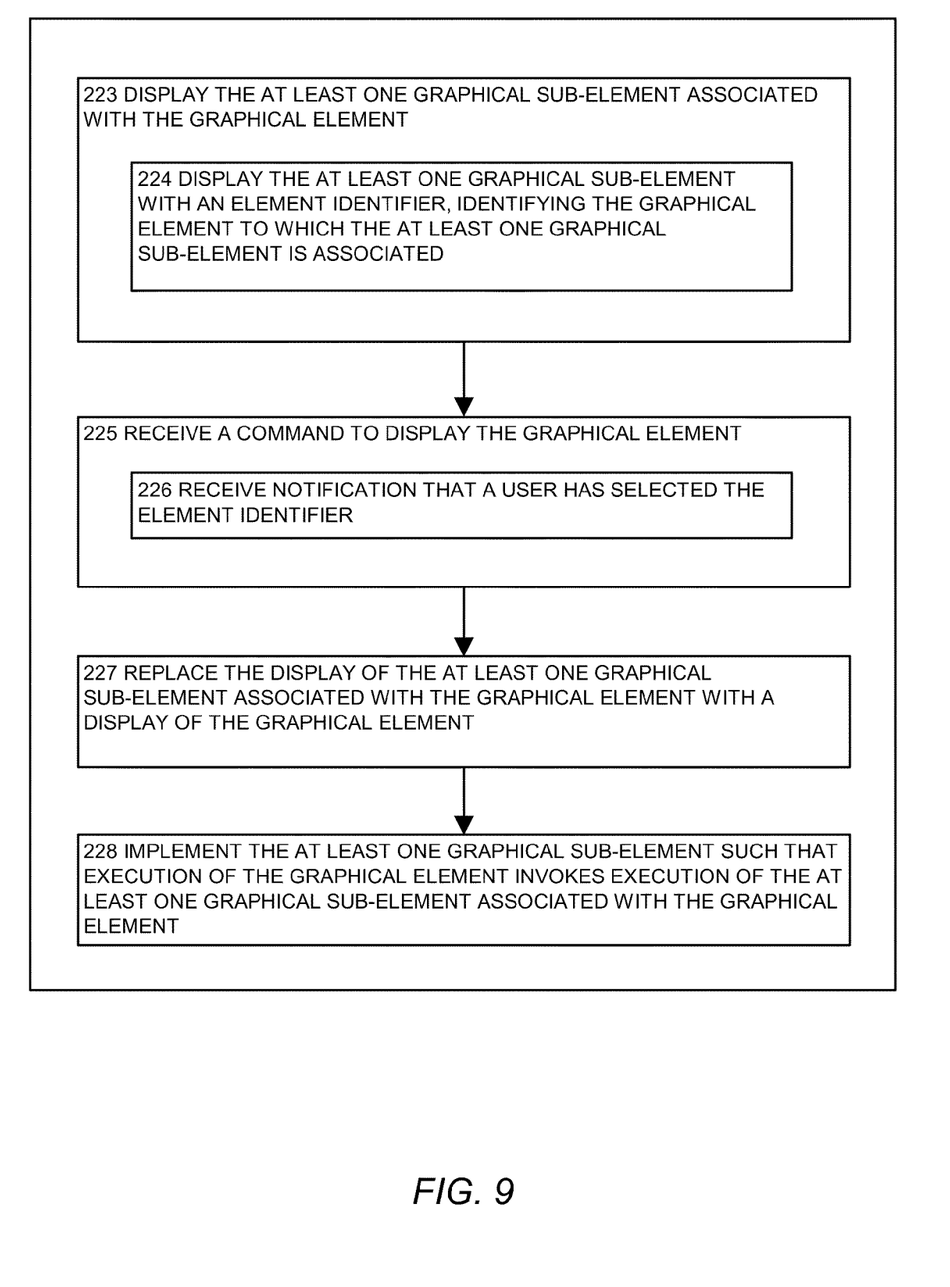
FIG. 9 illustrates a flowchart of a procedure performed by the system of FIG. 1 when the graphical element displaying process displays the at least one graphical sub-element associated with the graphical element, according to one embodiment disclosed herein.

FIG. 9 is a flowchart of the steps performed by the graphical element displaying process 140-2 when it displays at least one graphical sub-element 160 associated with the graphical element 155, according to one embodiment disclosed herein. The graphical sub-element 160 is displayed with an indication that it is associated with a graphical element 155.

In step 223, the graphical element displaying process 140-2 displays at least one graphical sub-element 160 associated with a graphical element 155. Within the storyboard 150, the graphical sub-elements 160 are displayed alongside any other graphical elements 155 (i.e., graphical elements 155 to which the graphical sub-element 160 is not associated).

In step 224, the graphical element displaying process 140-2 display the at least one graphical sub-element 160 with an element identifier 170, identifying the graphical element 155 to which at least one graphical sub-element 160 is associated. The element identifier 170 indicates that the graphical sub-element 160 is associated with a graphical element 155. In an example configuration, when a plurality of graphical sub-elements 160 are associated with a graphical element 155, only one element identifier 170 is associated with that plurality of graphical sub-elements 160.

In step 225, the graphical element displaying process 140-2 receives a command to display the graphical element 155. The graphical element displaying process 140-2 receives an indication to replace the graphical sub-element 160 with the graphical element 155 to which the graphical sub-element 160 is associated.

In step 226, the graphical element displaying process 140-2 receives notification that a user 108 has selected the element identifier 170. A graphical sub-element 160 or group of graphical sub-elements 160 has an element identifier 170 indicating that the graphical sub-element 160 or group of graphical sub-elements 160 is associated with a graphical element 155. In an example configuration, the graphical element displaying process 140-2 receives notification that a user 108 has selected the element identifier 170.

In step 227, the graphical element displaying process 140-2 replaces the display of at least one graphical sub-element 160 associated with the graphical element 155 with a display of the graphical element 155.

In step 228, the graphical element displaying process 140-2 implements at least one graphical sub-element 160 such that execution of the graphical element 155 invokes execution of at least one graphical sub-element 160 associated with the graphical element 155. During the execution of the storyboard 150, each graphical element 155 in the sequence of graphical elements 155 is executed (i.e., displayed within the storyboard). When a graphical element 155 to which graphical sub-elements 160 are associated, is executed, those graphical sub-elements 160 are executed (i.e., displayed within the storyboard). For example, a graphical element 155 could have a video graphical sub-element 160 associated with the graphical element 155. When the graphical element 155 is executed, the video 180 associated with the graphical element 155 is executed (i.e., the video 180 is run).

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method comprising:
    displaying an expanded display region within a storyboard rendered on a display screen associated with at least one computer system, the expanded display region concurrently displaying a first image thumbnail, at least one graphical sub-element associated with the first image thumbnail and at least one element identifier, the at least one element identifier representing a selectable functionality for minimizing a size of the expanded display region;
    receiving a selection of the at least one element identifier; and
    upon receiving the selection of the at least one element identifier:
        (i) terminating display of the at least one graphical sub-element;
        (ii) terminating display of the at least one element identifier;
        (iii) reducing the size of the expanded display region to create a minimized display region; and
        (iv) displaying the first image thumbnail within the minimized display region in the storyboard;
    wherein displaying the expanded display region includes: displaying an indication of a transition effect between the expanded display region and a second image thumbnail, the first image thumbnail representing a first video clip, the second image thumbnail representing a second video clip;
    wherein displaying the first image thumbnail within the minimized display region includes: upon reducing the size of the expanded display region to display the minimized display region in the storyboard, displaying the indication of the transition effect between the minimized display region and the second image thumbnail;
    wherein displaying the expanded display region includes: displaying a first graphical sub-element as an area demarcated within the first image thumbnail; and
    displaying a second graphical sub-element as an area demarcated within a copy of the first image thumbnail, the copy of the first image thumbnail displayed within the expanded display region, the first graphical sub-element and the second sub-element each indicative of a pan-and-zoom effect whereby, upon receiving a selection to execute the pan-and-zoom effect, the area demarcated within the first image thumbnail expands followed by expansion of the area demarcated within the copy of the first image thumbnail.

2. The method of claim 1, wherein displaying the first image thumbnail within the minimized display region includes:
    displaying at least one sub-element identifier within the minimized display region, the at least one sub-element identifier representing a selectable functionality for expanding the minimized display region to initiate display of the at least one graphical sub-element and the at least one element identifier.

3. The method as in claim 1, comprising:
    wherein displaying the expanded display region includes: displaying the expanded display region as visually distinct from background content of the storyboard; and
    wherein displaying the first image thumbnail within the minimized display region includes: upon reducing the size of the expanded display region to display the minimized display region in the storyboard, displaying the minimized display region as visually distinct from the background content of the storyboard.

4. The method as in claim 1, wherein displaying the at least one graphical sub-element within the expanded display region includes:
    displaying at least one description of an attribute of a video clip represented by the first image thumbnail.

5. The method as in claim 1, wherein displaying the at least one graphical sub-element associated with the first image thumbnail includes:
    displaying a timeline associated with a video clip represented by the first image thumbnail.

6. The method as in claim 5, wherein displaying the timeline associated with the video clip represented by the first image thumbnail includes:
    displaying a listing of multiple images included in the video clip;
    displaying an indication of a presentation duration for each of the multiple images; and
    displaying an indication of a presentation sequence of the multiple images.

7. The method as in claim 1, comprising:
    wherein displaying the expanded display region within the storyboard includes: within the storyboard:
        displaying the second image thumbnail outside at least one visible boundary of the expanded display region, wherein the at least one element identifier further represents the selectable functionality for minimizing the size of the expanded display region while maintaining display of the first thumbnail image; and
    wherein displaying the first image thumbnail within the minimized display region in the storyboard includes: within the storyboard:
        displaying the second image thumbnail outside at least one visible boundary of the minimized display region.

8. The method as in claim 1, comprising:
    upon receiving the selection to execute the pan-and-zoom effect:
        expanding image content from the area demarcated within the first image thumbnail to created create first expanded image content;
        filling an area previously occupied by the first image thumbnail in the expanded display region with the first expanded image content;
        after filling the area previously occupied by the first image thumbnail in the expanded display region with the first expanded image content, expanding image content from the area demarcated within the copy of the first image thumbnail to create second expanded image content; and
        filling the area previously occupied by the first image thumbnail in the expanded display region with the second expanded image content.

9. The method as in claim 8, wherein filling the area previously occupied by the first image thumbnail in the expanded display region with the second expanded image content includes:

replacing display of the first expanded image content in the area previously occupied by the first image thumbnail in the expanded display region with the second expanded image content.

10. The method as in claim 9, comprising:
upon receiving the selection to execute the pan-and-zoom effect:
   wherein expanding image content from the area demarcated within the first image thumbnail includes: in the first image thumbnail, expanding a first portion of an image depicted by both the first image thumbnail and the copy of the first image thumbnail; and
   wherein expanding image content from the area demarcated within the copy of the first image thumbnail includes: expanding a second portion of the image depicted by both the first image thumbnail and the copy of the first image thumbnail, the second portion different than the first portion.

11. The method as in claim 8, comprising:
wherein filling the area previously occupied by the first image thumbnail in the expanded display region with the second expanded image content includes:
   replacing display of the first expanded image content in the area previously occupied by the first image thumbnail in the expanded display region with the second expanded image content; and
wherein the steps of: (i) expanding image content to create first expanded image content, (ii) filling the area previously occupied by the first image thumbnail with the first expanded image content, (iii) expanding image content to create second expanded image content, and (iv) filling the area previously occupied by the first image thumbnail with the second expanded image content occur sequentially within the expanded display region as the storyboard concurrently displays a plurality of additional image thumbnails outside at least one visible boundary of the expanded display region.

12. The method as in claim 1, comprising:
wherein displaying the expanded display region within the storyboard includes:
   within the storyboard, concurrently displaying the second image thumbnail outside at least one visible boundary of the expanded display region, wherein the at least one element identifier further represents the selectable functionality for minimizing the size of the expanded display region while maintaining display of the first thumbnail image;
wherein displaying the first image thumbnail within the minimized display region in the storyboard includes:
   within the storyboard, displaying the second image thumbnail outside at least one visible boundary of the minimized display region;
upon receiving the selection to execute the pan-and-zoom effect:
   expanding image content from the area demarcated within the first image thumbnail to create first expanded image content;
   filling an area previously occupied by the first image thumbnail in the expanded display region with the first expanded image content;
   after filling the area previously occupied by the first image thumbnail in the expanded display region with the first expanded image content, expanding image content from the area demarcated within the copy of the first image thumbnail to create second expanded image content; and
   replacing display of the first expanded image content in the area previously occupied by the first image thumbnail in the expanded display region with the second expanded image content.

13. The method as in claim 12, comprising:
upon receiving the selection to execute the pan-and-zoom effect:
   wherein expanding image content from the area demarcated within the first image thumbnail includes: in the first image thumbnail, expanding a first portion of an image depicted by both the first image thumbnail and the copy of the first image thumbnail, wherein the first image thumbnail is concurrently displayed with the copy of the first image thumbnail; and
   wherein expanding image content from the area demarcated within the copy of the first image thumbnail includes: expanding a second portion of the image depicted by both the first image thumbnail and the copy of the first image thumbnail, the second portion different than the first portion.

14. The method as in claim 1, wherein upon receiving the selection to execute the pan-and-zoom effect includes:
   expanding the area demarcated within the first image thumbnail, wherein the area demarcated within the first image thumbnail comprises a first portion of an image depicted by both the first image thumbnail and the copy of the first image thumbnail; and
   after expanding the area demarcated within the first image thumbnail, expanding the area demarcated within the copy of the first image thumbnail, wherein the area demarcated within the copy of the first image thumbnail comprises a second portion of the image depicted by both the first image thumbnail and the copy of the first image thumbnail, wherein the first portion is different than the second portion.

15. A non-transitory computer readable medium comprising executable instructions encoded thereon operable on a computerized device to perform processing comprising:
   instructions for displaying an expanded display region within a storyboard; the expanded display region concurrently displaying a first image thumbnail, at least one graphical sub-element associated with the first image thumbnail and at least one element identifier, the at least one element identifier representing a selectable functionality for minimizing a size of the expanded display region;
   instructions for receiving a selection of the at least one element identifier; and
   upon receiving the selection of the at least one element identifier:
      (i) instructions for terminating display of the at least one graphical sub-element;
      (ii) instructions for terminating display of the at least one element identifier;
      (iii) instructions for reducing the size of the expanded display region to create a minimized display region; and
      (iv) instructions for displaying the first image thumbnail within the minimized display region in the storyboard;
   wherein the instructions for displaying the expanded display region include: instructions for displaying an indication of a transition effect between the expanded display region and a second image thumbnail, the first image thumbnail representing a first video clip, the second image thumbnail representing a second video clip;

wherein the instructions for displaying the first image thumbnail within the minimized display region include:
instructions for displaying the indication of the transition effect between the minimized display region and the second image thumbnail upon reducing the size of the expanded display region to display the minimized display region in the storyboard;

wherein the instructions for displaying the expanded display region include:
instructions for displaying a first graphical sub-element as an area demarcated within the first image thumbnail; and
instructions for displaying a second graphical sub-element as an area demarcated within a copy of the first image thumbnail, the copy of the first image thumbnail displayed within the expanded display region, the first graphical sub-element and the second sub-element each indicative of a pan-and-zoom effect whereby, upon receiving a selection to execute the pan-and-zoom effect, the area demarcated within the first image thumbnail expands followed by expansion of the area demarcated within the copy of the first image thumbnail.

16. The computer readable medium of claim 15, wherein the instructions for displaying the first image thumbnail within the minimized display region include:
instructions for displaying at least one sub-element identifier within the minimized display region, the at least one sub-element identifier representing a selectable functionality for expanding the minimized display region to initiate display of the at least one graphical sub-element and the at least one element identifier.

17. The computer readable medium of claim 15, comprising:
wherein the instructions for displaying the expanded display region include:
instructions for displaying the expanded display region as visually distinct from background content of the storyboard; and
wherein the instructions for displaying the first image thumbnail within the minimized display region include:
instructions for displaying the minimized display region as visually distinct from the background content of the storyboard upon reducing the size of the expanded display region to display the minimized display region in the storyboard.

18. The computer readable medium of claim 15, wherein the instructions for displaying the at least one graphical sub-element within the expanded display region include:
instruction for displaying at least one description of an attribute of a video clip represented by the first image thumbnail.

19. The computer readable medium of claim 15, wherein the instructions for displaying the at least one graphical sub-element associated with the first image thumbnail include:
instructions for displaying a timeline associated with a video clip represented by the first image thumbnail.

20. The computer readable medium of claim 19, wherein the instructions for displaying the timeline associated with the video clip represented by the first image thumbnail include:
instructions for displaying a listing of multiple images included in the video clip;
instructions for displaying an indication of a presentation duration for each of the multiple images; and
instructions for displaying an indication of a presentation sequence of the multiple images.

21. A computer system comprising:
a processor;
a memory unit that stores instructions associated with an application executed by the processor; and
an interconnect coupling the processor and the memory unit, enabling the computer system to execute the application and perform operations of:
displaying an expanded display region within a storyboard rendered on a display screen associated with at least one computer system, the expanded display region concurrently displaying a first image thumbnail, at least one graphical sub-element associated with the first image thumbnail and at least one element identifier, the at least one element identifier representing a selectable functionality for minimizing a size of the expanded display region;
receiving a selection of the at least one element identifier; and
upon receiving the selection of the at least one element identifier:
(i) terminating display of the at least one graphical sub-element;
(ii) terminating display of the at least one element identifier;
(iii) reducing the size of the expanded display region to create a minimized display region; and
(iv) displaying the first image thumbnail within the minimized display region in the storyboard;
wherein displaying the expanded display region includes: displaying an indication of a transition effect between the expanded display region and a second image thumbnail, the first image thumbnail representing a first video clip, the second image thumbnail representing a second video clip;
wherein displaying the first image thumbnail within the minimized display region includes: upon reducing the size of the expanded display region to display the minimized display region in the storyboard, displaying the indication of the transition effect between the minimized display region and the second image thumbnail;
wherein displaying the expanded display region includes:
displaying a first graphical sub-element as an area demarcated within the first image thumbnail; and
displaying a second graphical sub-element as an area demarcated within a copy of the first image thumbnail, the copy of the first image thumbnail displayed within the expanded display region, the first graphical sub-element and the second sub-element each indicative of a pan-and-zoom effect whereby, upon receiving a selection to execute the pan-and-zoom effect, the area demarcated within the first image thumbnail expands followed by expansion of the area demarcated within the copy of the first image thumbnail.

* * * * *